United States Patent [19]
Zentmyer

[11] Patent Number: 5,413,015
[45] Date of Patent: May 9, 1995

[54] AUTOMOTIVE VEHICLE DIFFERENTIAL ASSEMBLY

[76] Inventor: John Zentmyer, P.O. Box 2144, Toluca Lake, Calif. 91610

[21] Appl. No.: 82,719

[22] Filed: Jun. 28, 1993

[51] Int. Cl.⁶ ............................................. F16H 48/12
[52] U.S. Cl. ................................... 74/650; 192/70.28
[58] Field of Search ............. 192/49, 50, 70.27, 89.2, 192/89.27, 89.28, 70.28, 106.2; 74/650

[56] References Cited

U.S. PATENT DOCUMENTS

| | | | |
|---|---|---|---|
| 1,324,501 | 12/1919 | Gerdeman | 192/70.28 |
| 1,743,060 | 1/1930 | Cartwright | 74/650 |
| 1,883,394 | 10/1932 | Mosher et al. | 192/70.28 |
| 3,507,486 | 4/1970 | Schwaller | 267/168 |
| 4,573,562 | 3/1986 | DeLand | 192/106.2 |
| 4,640,143 | 2/1987 | Schou | 74/650 |

FOREIGN PATENT DOCUMENTS

| | | | |
|---|---|---|---|
| 576907 | 5/1933 | Germany | 74/650 |
| 4712573 | of 1972 | Japan | 267/168 |

*Primary Examiner*—Rodney H. Bonck
*Assistant Examiner*—Nathan O. Jensen
*Attorney, Agent, or Firm*—Roger A. Marrs

[57] ABSTRACT

A differential assembly having a driving case enclosing a pair of driving members operably coupled with a pair of driven members. The driven members are secured to output shafts and the driving members are forcibly driven by a driving shaft having its opposite ends in engagement with the driving case. The mid-section of the driving shaft passes through an eccentric or angled aperture formed by cooperating arcuate surfaces provided in opposing surfaces of the driving members. The driving members and the driven members are urged together respectively by double oppositely wound concentric springs bearing against a pin carried in an elongated hole coextensively provided in opposing surfaces of adjacent driving members of both pairs. Inspection and access openings are provided in passageways and in the oblong cross-section of part of the passageways.

4 Claims, 2 Drawing Sheets

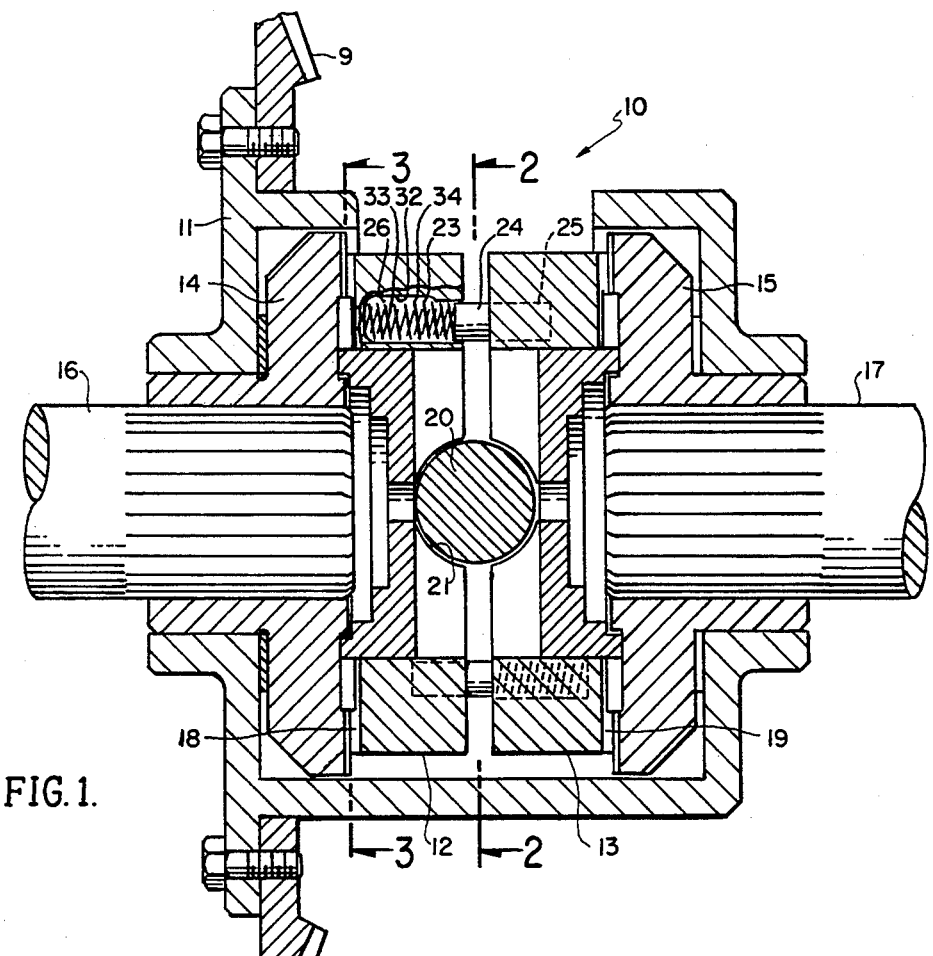
FIG. 1.
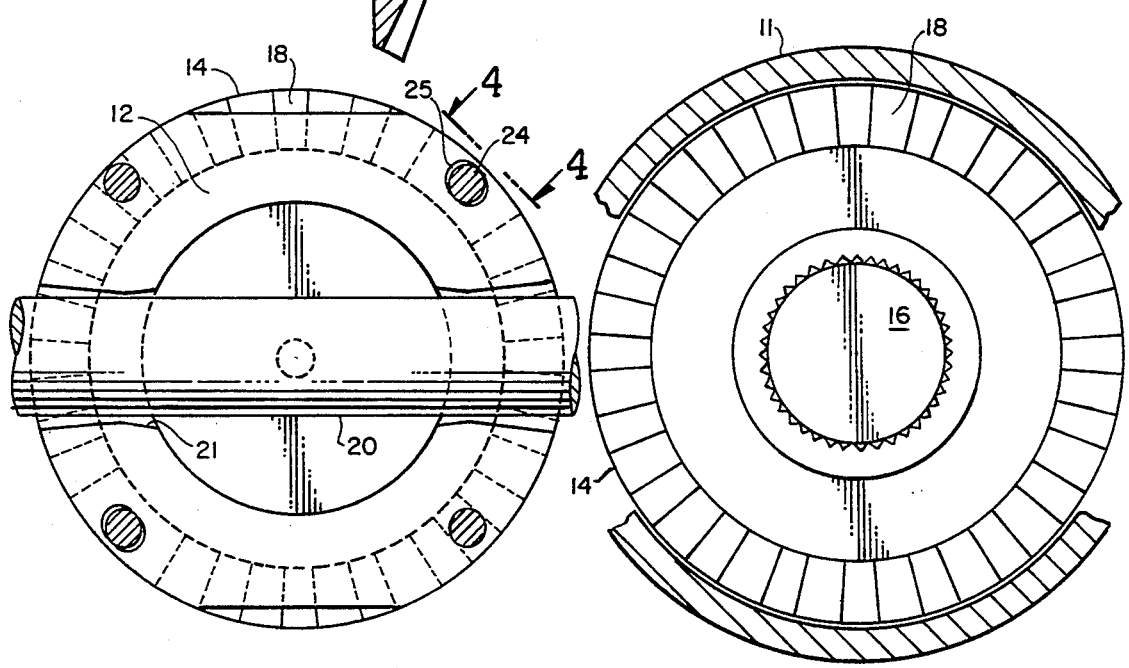
FIG. 2.
FIG. 3.

AUTOMOTIVE VEHICLE DIFFERENTIAL ASSEMBLY

BACKGROUND OF THE INVENTION

1. Field of the Invention

The present invention relates to the field of automatic locking differential mechanisms for motor vehicles or the like and more particularly, to a novel differential mechanism incorporating improvements in manufacturability and assembly thereof utilizing a coaxial double spring arrangement in combination with a pin held in an elongated flat ended hole in the driving members of the mechanism which greatly simplifies both original manufacture and installation in the vehicle.

2. Brief Description of the Prior Art

In the past, it has been the conventional practice to construct automatic differential mechanisms with two locking-unlocking toothed clutch members which are driven by a common driving shaft and wherein the driving clutch members drive driven members in order to form an automatic locking differential for automotive applications. Each clutch member operates independently to drive its associated axle shaft connected to the driven member; however, the drive members are connected to one another in such a manner that a differentiating action occurs when the vehicle turns. In order to provide this differentiating action, resilient means are provided in cooperation with pins to inter-couple the opposing surfaces of the driving members.

However, problems and difficulties have been encountered with the above conventional construction which stems largely from the fact that the use of conventional single spring interfacing means and pin interconnection between clutch members is difficult and cumbersome to manufacture, install and maintain. This stems largely from the fact that the single compression spring construction sometimes fails and it is difficult to replace or repair broken or damaged springs. Also, access to the pin and spring installation is difficult requiring special tools and specialized knowledge. Even in the initial installation, the procedure for installing the pin and spring arrangement is time-consuming and awkward.

Therefore, a long-standing need has existed for a differential mechanism which permits assembly, maintenance and repair in both manufacture and installation to be as simple as possible so that the likelihood of problems is greatly reduced.

Such a means should provide ready access to the parts intended to be installed and yet, overall performance must not be reduced.

SUMMARY OF THE INVENTION

Accordingly, the above problems and difficulties are avoided by the present invention which provides a novel differential mechanism having driving clutch plates arranged back to back but separated by the presence of a driving shaft wherein the plates or clutch members are coupled together by a pin and spring arrangement. In one form of the invention, the spring takes the form of a pair of oppositely-wound concentric springs carried in one end of an elongated hole or passageway while the other end of the hole or passageway is occupied by an elongated pin. One end of the concentric springs bears against one end of the pin, while the opposite ends of the pin and the concentric springs bear against flat endings of the hole or passageway. An access opening is communicated between the elongated passageway in each of the respective clutch members and the exterior of the device. The differential mechanism further includes a housing which is provided with an enlarged opening through which access may be had to the access opening and therefore to the springs and pin arrangement. By such exposure, the installation, maintenance and repair are made more accessible and greatly simplified.

Therefore, the primary object of the present invention is to provide a means of assembly which simplifies both manufacture and installation of component parts in said differential mechanism.

Another object of the present invention is to provide a differential mechanism wherein component parts of the assembly, such as clutch members, are joined together by a resilient means comprising a pair of oppositely-wound concentric springs bearing against a pin so that the strength of the spring and reliability of the resilient means are increased.

Another object of the present invention is the provision of a cutout or enlarged opening in the side of the differential housing or case which permits installation of the requisite spring combination with ease and without the need for special tools.

Another object of the present invention resides in the replacement of the single spring arrangement in the conventional differential mechanisms with an assembly composed of two oppositely-wound concentric springs and which further includes an access opening in both the clutch members and the housing therefor so that the springs can readily be installed, repaired or maintained.

Yet another object of the present invention is to provide a resilient means interconnecting the clutch members in a differential assembly which includes springs that impinge directly on the ends or their respective opposing pins rather than on a connecting medium or some other portion of the assembly as is experienced with conventional differential mechanisms.

Yet another object of the present invention is to provide a differential mechanism with passageways for holding the resilient means so that the top portion of the internal passageway is defined having an oblong shape rather than a completely round shape as employed in conventional assemblies.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a longitudinal cross-sectional view of a differential mechanism incorporating the present invention;

FIG. 2 is a transverse cross-sectional view of the mechanism shown in FIG. 1 as taken in the direction of arrows 2—2 thereof;

FIG. 3 is a transverse cross-sectional view of the mechanism shown in FIG. 1 as taken in the direction of arrows 3—3 thereof;

DESCRIPTION OF THE PREFERRED EMBODIMENT

Figure 4:
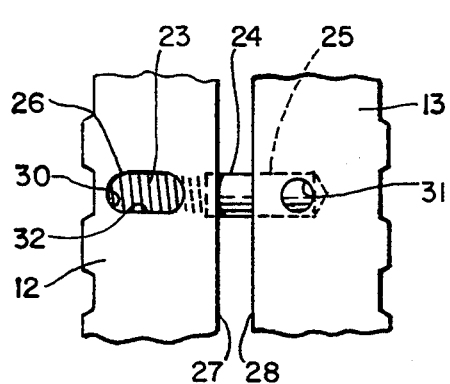
FIG. 4 is an enlarged fragmentary view-of the novel pin and resilient means assembly as taken in the direction of arrows 4—4 of FIG. 2.

With respect to FIG. 1, an automotive differential mechanism using the present invention is illustrated which applies equal amounts of torque to each of the rear wheels of a vehicle. If one wheel spins with only a small amount of torque applied, the other wheel also receives the same amount of torque such that the vehicle will not move. However, the differential mechanism illustrated can deliver 100% of the applied torque to either wheel so as to allow the wheel with the most traction to propel the vehicle.

Referring to FIGS. 1-3 inclusive, the novel differential mechanism of the present invention is illustrated in the general direction of arrow 10 which is carried within a housing (not shown) and has an integral flange member 11 upon which a ring drive gear 9 is mounted. A pair of clutch mechanisms is carried within the integral flange member and are represented by numerals 12 and 13, which are driving members of the clutch and numerals 14 and 15, which are driven members of the clutch mechanism. Each of the respective clutch members 14 and 15 is coupled to output shafts 16 and 17 such as by being splined in engagement with the respective driven clutch members 14 and 15. Clutch drive members 12 and 13 are in driving relationship with the clutch driven members 14 and 15 by means of meshed radial teeth indicated by numerals 18 and 19 respectively.

A driving shaft 20 acts upon an angled portion of a driving recess 21 which may be referred to as an angled recess or an eccentric journal which causes an axial force to be exerted by the driving members 12 and 13 upon the driven members 14 and 15. This movement maintains the teeth 18 and 19 engaged and additionally provides a rotational force that causes the driving members 12 and 13 to rotate driven members 14 and 15, turning the shafts 16 and 17 and propelling the vehicle.

Primarily, it is to be understood that the teeth 18 and 19 meshed between opposing surfaces of clutch members 12 and 14 and clutch members 13 and 15 are urged in contact by resilient means such as the spring assembly composed of two oppositely-wound concentric springs represented by the numeral 23. The compression springs, to be described later, act against a pin 24 held in a recess 25. Pin 24 has a portion extending between the opposing rear faces of driving clutch members 12 and 13 into the elongated top portion of recess 26 formed in the other driving clutch member.

It is noted that although one spring assembly and pin arrangement has been described, at least four such arrangements are utilized in the novel differential mechanism of the present invention. The additional spring assembly and pin arrangements are circumferentially disposed and are longitudinally oppositely oriented.

When employing the differential mechanism of the present invention, as the vehicle turns, driving member 12 or 13 rotates slightly so that the side of hole 26 touches pin 24 and then moves the spring assembly 26 rearwardly and then forwardly against the pin as driven member 14 continues to rotate.

Referring now in detail to FIG. 4, it can be seen that the elongated holes 25 and 26 in the respective driven clutch members 13 and 12 are open on the opposing faces of the respective clutch members and these faces are identified by numerals 27 and 28 respectively. It can also be seen that the pin 24 is exposed in the space between these opposing surfaces; however, the extreme end of pin 24 projects into the entrance of hole 26 and it is against this end that the spring assembly 23 bears at one end while its opposite end bears against a flat hole termination, as indicated at numeral 30. It is of importance to note in FIGS. 2 and 4 that the top of hole 26 is oblong in transverse cross-section whereas the pin 24 and hole 25 are round in cross-section. Also, it can be seen that hole 25 includes an inspection opening or aperture 31 while an access opening 32 is provided in the member 12 so that the spring assembly is visible. It is through this latter opening that the mechanism may be joined together during installation by compression and insertion of the spring assembly 26 and permitting it to expand so that the components are maintained in the respective holes 25 and 26.

Figure 5:
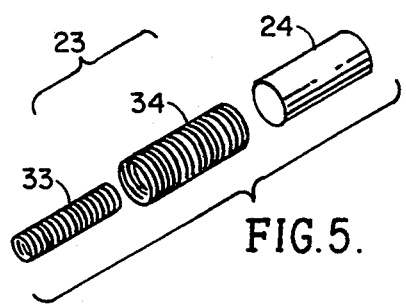
FIG. 5 is an exploded view of the resilient means and pin assembly used in the construction and installation shown in FIG. 4.

Referring to FIG. 5, it can be seen that the resilient means takes the form of a pair of springs 33 and 34 which are concentric with respect to one another since the spring of smaller diameter, represented by number 33, is inserted into the hollow of the spring 34. Therefore, should one spring break or become weakened, the mechanism will continue to function as the second spring will bear the load and prevent the broken spring from exiting the assembly.

Figure 6:
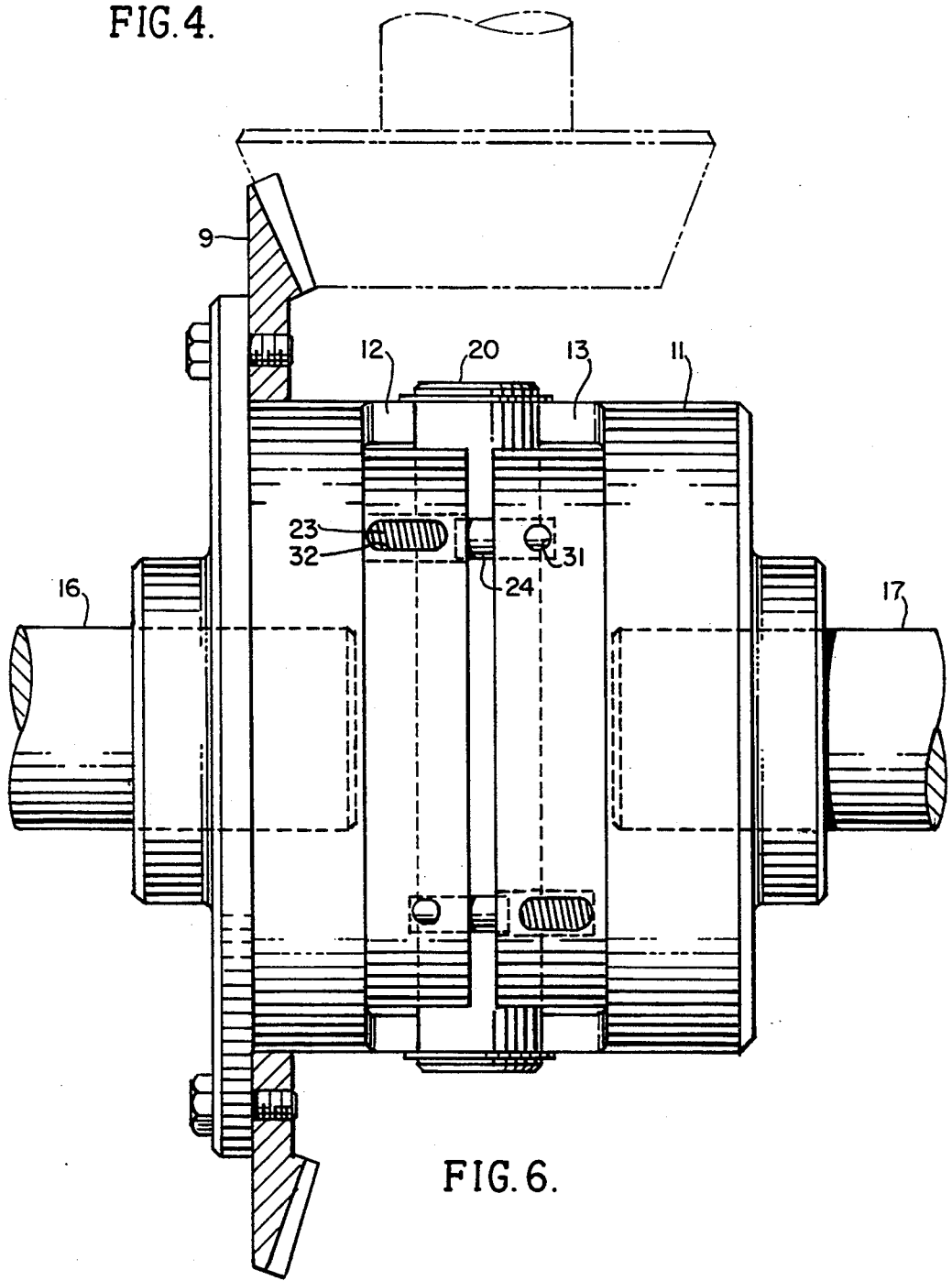
FIG. 6 is a side elevational view of the differential mechanism as shown in FIG. 1.

Referring now to FIG. 6, both the access and inspection openings 31 and 32 are illustrated for two of the four spring and pin assemblies. The spring assembly 23 is visible through the opening 32 while one end of the pin 24 is exposed through the opening 31. The spring assembly may readily be passed in and out of the access opening 32 for original assembly, for repair purposes, or for maintenance. The double spring arrangement of the resilient means 23 comprising the two oppositely-wound concentric springs 33 and 34 replace the single spring used in conventional mechanisms. By such means, the subject invention greatly improves manufacturability and assembly. The present invention further permits impingement of the spring assembley 23 directly on the end of the opposing pin 24. This practice of assembly simplifies both manufacture and installation, and assembly and installation may be performed by unskilled persons using simple hand tools rather than complicated specialized tools so that a viable, marketable product which functions well is provided.

By providing the passageway with a cutout or window in the side, installation is permitted whereby the insertion of the pair of springs may be permitted. The top portion of the hole containing the spring assembly is shaped in an oblong manner rather than a completely round shape which increases the strength of the part.

While particular embodiments of the present invention have been shown and described, it will be obvious to those skilled in the art that changes and modifications may be made without departing from this invention in its broader aspects and, therefore, the aim in the appended claims is to cover all such changes and modifications, as fall within the true spirit and scope of this invention.

What is claimed is:

1. A differential mechanism comprising:
   output means;
   driving means in spaced relationship to said output means;

driven means operably responsive to said driving means for powering said output means;

said driving means having a pair of clutch driving members coaxially disposed with respect to each other and having opposing spaced-apart surface faces;

biasing means interposed between said driving surface faces comprising at least a pin in alignment with a spring assembly consisting of two concentric springs bearing against one end of said pin;

said springs and said pin in axial alignment disposed in an elongated passageway jointly provided in each of said pair of clutch drive members;

each of said clutch drive members has inspection and access openings communicating with said passageway so as to expose said springs and said pins respectively; and said spring passageway is of oblong configuration in transverse cross-section.

2. A differential mechanism comprising:

output means;

driving means in spaced relationship to said output means;

driven means operably responsive to said driving means for powering said output means;

said driving means having a pair of clutch driving members coaxially disposed with respect to each other and having opposing spaced-apart surface faces;

biasing means interposed between said driving member surface faces comprising at least a pin in alignment with a spring assembly consisting of two concentric springs bearing against one end of said pin;

said springs and said pin in axial alignment disposed in an elongated passageway jointly provided in each of said pair of clutch drive members; and said passageway is composed of two passageway portions, one portion in each of said driving members and coextensive with each other with said pin occupying one passageway portion and said springs occupying the other passageway portion and with opposing ends of said pin and said springs bearing against each other.

3. The invention as defined in claim 2 wherein:

said passageway is oblong in cross-section.

4. The invention as defined in claim 3 includes:

an access opening leading into one of said passageway portions and an inspection aperture leading into the other one of said portions.

* * * * *